June 18, 1946.  M. R. ANDREWS  2,402,271
RADIO COMPASS DEMONSTRATOR
Filed Jan. 16, 1945   2 Sheets-Sheet 1

INVENTOR
M. R. Andrews
BY *Webster & Webster*
ATTORNEYS

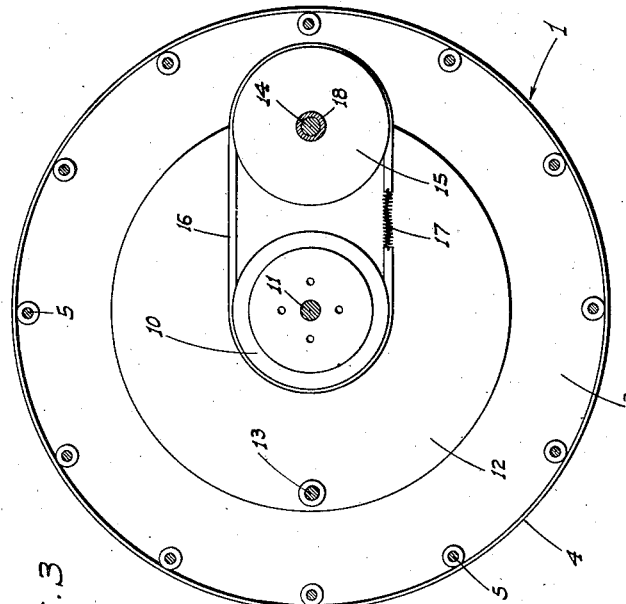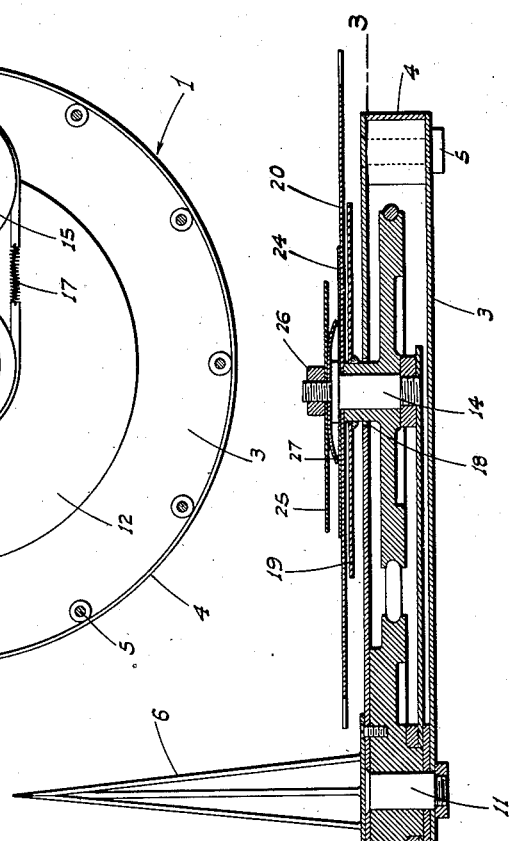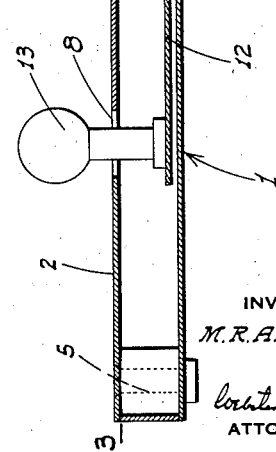

Patented June 18, 1946

2,402,271

UNITED STATES PATENT OFFICE 2,402,271

RADIO COMPASS DEMONSTRATOR

Melvin R. Andrews, Junction City, Oreg.

Application January 16, 1945, Serial No. 573,086

17 Claims. (Cl. 35—39)

This invention relates to, and it is an object to provide, a portable manually controlled device adapted to demonstrate to aviation students various navigational problems pertaining to the use of a radio compass on an airplane.

In teaching radio compass navigation, instructors—when explaining a navigational problem—frequently encounter difficulty in illustrating the actual directional position of the airplane in relation to instrument readings.

It is therefore another object of this invention to provide a radio compass demonstrator which is arranged to indicate visually to a student the relative directional position of the airplane to the radio tower, upon occurrence of given magnetic and radio compass headings, whereby to facilitate the student's correlation of said headings and his determination and understanding of the proper course, or the solution of a navigational problem.

An additional object of the present invention is to provide a radio compass demonstrator which includes, with a supporting base, a representation of an upstanding radio tower mounted on said base, a model in plan of an airplane mounted for movement about the tower in a concentric path, the airplane when so moved being arranged to automatically maintain a selected but manually adjustable magnetic heading which is readable upon a representation of a magnetic compass dial movable in unitary but adjustable relation with the airplane through said path, a representation of a radio compass dial secured on the airplane, and a radio compass pointer reading on said dial and movable in unitary relation with the airplane through said path, the radio compass pointer being arranged to automatically maintain a selected position relative to the tower.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 2 is an enlarged diametric sectional elevation of the device.

Figure 3 is a cross section on line 3—3 of Fig. 2.

Figure 1:
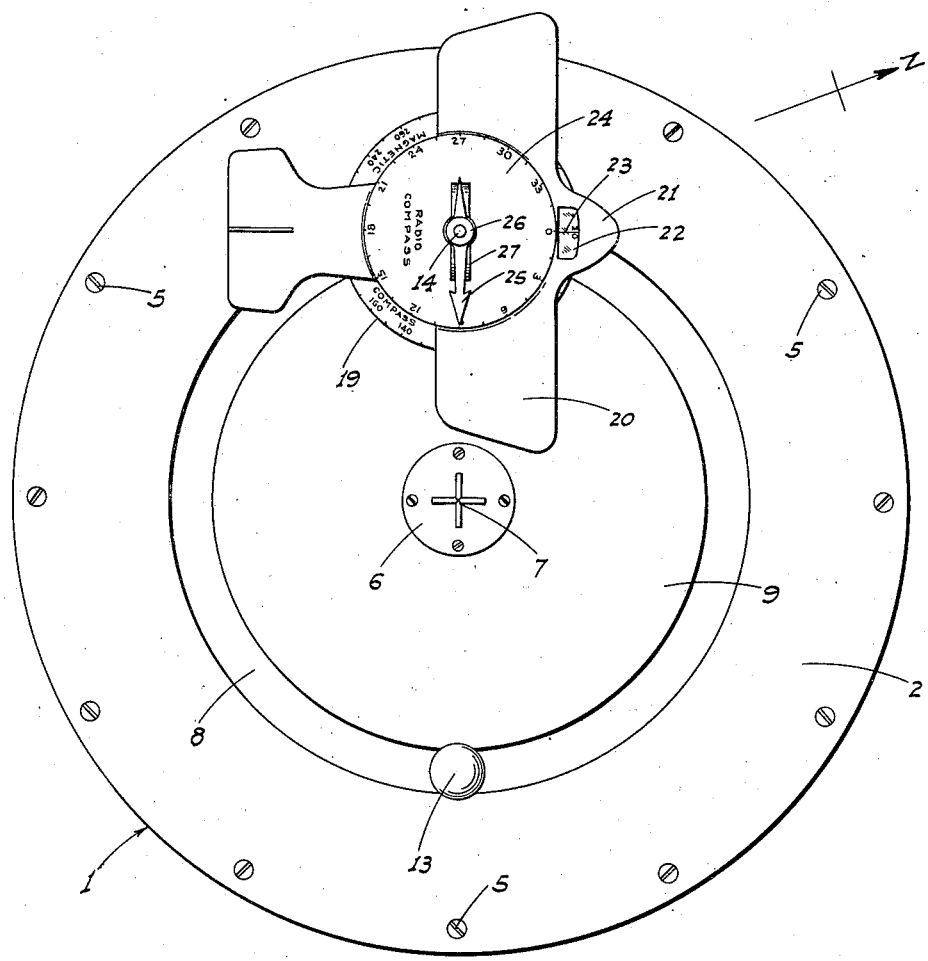
Figure 1 is a top plan view of the device.

Referring now more particularly to the characters of reference on the drawings, the device comprises a flat portable circular base 1 which is hollow but relatively shallow; said circular base 1 including a top plate 2 and a bottom plate 3 connected together adjacent the periphery and inwardly of an end wall 4 by means of cross bolts 5.

Centrally of the top plate 2 the device includes an upstanding miniature representation of a radio tower 6 which is fixed to a pedestal plate 7 secured to the top plate 2. Substantially half way between the tower 6 and end wall 4 the top plate 2 has a circular slot 8 cut therethrough in concentric relation to said tower; the portion of the top plate 2 inwardly of the slot 8 being therefore a separate circular portion 9. A pulley 10 is disposed in the base 1 between the bottom plate 3 and the top plate portion 9; said portion, together with the tower, being fixed to the pulley and said pulley in turn being non-rotatably mounted on a vertical spindle 11 fixed in connection with and upstanding from the bottom plate 3.

A circular disc 12 is mounted in the base 1 for rotation about the spindle 11 and is disposed directly below but in rotatable relation to the fixed pulley 10. The disc 12 is of sufficient diameter to underly the slot 8 and an operating handle 13 is fixed on said disc and projects upwardly through the slot 8 for hand engagement.

At a diametrally opposed point the disc 12 supports the following mechanism:

A vertical spindle 14 is fixed in connection with the disc 12 and projects upwardly through the slot 8 to a termination some distance thereabove; said spindle turnably supporting, within the base 1, another pulley 15 in alinement with and of the same diameter as the pulley 10. The pulleys 10 and 15 are connected by an endless belt 16 whose tension is maintained by an interposed spring 17.

The pulley 15 includes an upwardly extended hub 18 which projects through the top plate 2 to a termination a short distance thereabove but below the upper end of the spindle 14. Above the top plate 2 the hub 18 fixedly supports a circular dial 19 marked to represent the face of a magnetic compass, said face being marked in degrees.

Above the dial 19 the hub 18 supports, in normally fixed but relatively rotatably adjustable relation, a small scale model, in plan, of an airplane, said airplane model being horizontally disposed and indicated at 20. The airplane 20 normally turns with the hub 18 about the spindle 14 and includes a forwardly projecting nose 21 having a window 22 therethrough intersected by a longitudinally extending cross-hair 23 readable on the magnetic compass dial 19.

On top of the airplane 20 there is fixed another dial 24 marked in degrees to represent the face of a radio compass; said radio compass dial having the zero mark adjacent and alined with the cross-hair 23.

A radio compass pointer 25 is relatively rotatably adjustably secured to the spindle 14 above the radio compass dial 24 and reads upon the latter. The pointer 25 is normally held against rotation relative to the spindle 14 by means of a releasable nut 26 threaded on the upper end of the spindle 14 and a spring washer 27 surrounding the threaded portion of the spindle beneath the pointer 25 and engaging between the latter and upper surface of the airplane 20. This produces a frictional engagement between the parts which maintains the pointer and spindle 14 in any adjusted rotative position.

By reason of the described structural arrangement, it will be seen that with movement of the handle 13 about the slot 8 the assembly of the airplane 20, dials 19 and 24, and pointer 25 likewise traverse a circular path. However, by reason of the described pulley and belt unit and the particular mounting of the airplane and dials, said airplane will at any point in said path about the tower 6 maintain the same heading, i. e. will always head in exactly the same direction, with cross-hair 23 holding the same reading on dial 19. Further, the radio compass pointer 25, in whatever position set, will maintain said set position relative to the tower 6 regardless of the point at which the airplane 20 is disposed in its rotative path.

The device may be employed to demonstrate many navigational problems involving the use of the radio compass, and which problems are not herein described. However, by way of example the following is a radio range problem which may be effectively demonstrated by the device:

Assuming that the airplane 20 is of a type including an automatic radio compass, the pointer 25 is set so that it points directly toward the tower 6, and the airplane is set on a magnetic course, here illustrated as 20° east of magnetic north. This heading is illustrated by the cross-hair 23 reading on the number 20 on the magnetic compass dial 19.

Flying this magnetic heading, the manner in which the pilot can correct his course to fly directly toward the tower 6—which we may assume is located at the landing strip—is demonstrated by the device as follows:

First the magnetic heading is ascertained by reading the cross-hair 23 on the magnetic compass dial 19, here 20° east of magnetic north. Thereafter the radio compass pointer 25 is read on the radio compass dial 24 at 90°, and in this particular relationship the magnetic heading of 20° is added to the radio compass heading of 90°, giving a total correction of 110°. The pilot would then make a correction of 110° in the ascertained direction to fly directly toward the tower 6.

In an actual airplane the magnetic compass and radio compass dials are of course vertically disposed in front of the pilot, and therefore to the beginner it is difficult for the instructor to visually demonstrate airplane position in correlation to magnetic compass and radio compass headings as read on said vertical dials. However, with the device which is the subject of this invention the actual position of the airplane, as correlated to magnetic compass and radio compass headings, is readily visually demonstrated.

As is obvious, many different courses may be demonstrated by adjusting the airplane 20 about the spindle 14; and for demonstrating navigational problems as related to certain types of airplanes, as for example an airplane whose radio compass includes a fixed loop or nose null, the pointer 25 will be adjusted to read on the zero of the radio compass dial 24 rather than pointing at the tower 6.

The device can also be effectively used to demonstrate problems in radio range work, as for instance bracketing the beam.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. An airplane radio compass demonstrator comprising a base, a representation of a radio tower on the base, a model of an airplane mounted in connection with the base for movement in a predetermined path about the tower, means to maintain the airplane on a predetermined heading throughout said path, a radio compass dial on the airplane, a rotary pointer movable with the airplane and readable on the dial, and means to maintain said pointer in a predetermined position relative to the tower throughout said path of the airplane.

2. An airplane radio compass demonstrator comprising a base, a representation of a radio tower on the base, a model of an airplane mounted in connection with the base for movement in a predetermined path about the tower, means to maintain the airplane on a predetermined heading throughout said path, a radio compass dial on the airplane, a rotary pointer movable with the airplane and readable on the dial, and means to maintain said pointer in a predetermined position relative to the tower throughout said path of the airplane; the airplane being mounted for adjustment whereby to alter said heading.

3. An airplane radio compass demonstrator comprising a base, a representation of a radio tower on the base, a model of an airplane mounted in connection with the base for movement in a predetermined path about the tower, means to maintain the airplane on a predetermined heading throughout said path, a radio compass dial on the airplane, a rotary pointer movable with the airplane and readable on the dial, and means to maintain said pointer in a predetermined position relative to the tower throughout said path of the airplane; the pointer being mounted for adjustment whereby to alter said predetermined position thereof.

4. An airplane radio compass demonstrator comprising a base, a representation of a radio tower on the base, a model of an airplane mounted in connection with the base for movement in a predetermined path about the tower, means to maintain the airplane on a predetermined heading throughout said path, a radio compass dial on the airplane, a rotary pointer movable with the airplane and readable on the dial, and means to maintain said pointer in a predetermined position relative to the tower throughout said path of the airplane; the airplane and pointer being mounted for adjustment whereby to alter said heading of the airplane and the predetermined position of the pointer respectively.

5. An airplane radio compass demonstrator comprising a base, a representation of a radio tower on the base, a model of an airplane mounted in connection with the base for movement in a predetermined path about the tower, means to maintain the airplane on a predetermined heading throughout said path, a radio compass dial on the airplane, a rotary pointer movable with the airplane and readable on the dial, and means to maintain said pointer in a predetermined position relative to the tower throughout said path of the airplane; there being a magnetic compass dial movable as a unit with the airplane throughout said path, the airplane including an element readable on said magnetic compass dial, said airplane and magnetic compass dial being normally relatively fixed but manually adjustable relative to each other whereby to alter the predetermined heading of the airplane.

6. A device as in claim 5 in which the airplane and said dials are superimposed and face outwardly.

7. An airplane radio compass demonstrator comprising a base, a representation of a radio tower on the base, a model of an airplane mounted in connection with the base for movement in a predetermined path about the tower, means to maintain the airplane on a predetermined heading throughout said path, a radio compass dial on the airplane, a rotary pointer movable with the airplane and readable on the dial, means to maintain said pointer in a predetermined position relative to the tower throughout said path of the airplane; a magnetic compass dial mounted for movement as a unit with the airplane throughout said path, the airplane and said magnetic compass dial being normally relatively fixed but manually adjustable to alter the predetermined heading of the airplane, and an element on the airplane readable on the magnetic compass dial.

8. An airplane radio compass demonstrator comprising a base, a representation of a radio tower on the base, a model of an airplane mounted in connection with the base for movement in a predetermined path about the tower, means to maintain the airplane on a predetermined heading throughout said path, a radio compass dial on the airplane, a rotary pointer movable with the airplane and readable on the dial, means to maintain said pointer in a predetermined position relative to the tower throughout said path of the airplane; a magnetic compass dial mounted for movement as a unit with the airplane throughout said path, the airplane and said magnetic compass dial being normally relatively fixed but manually adjustable to alter the predetermined heading of the airplane, and an element on the airplane readable on the magnetic compass dial; the airplane and magnetic compass dial being mounted for said manual adjustment rotatably about a common axis whereby said element reads concentrically on the magnetic compass dial.

9. An airplane radio compass demonstrator comprising a base, a representation of a radio tower on the base, a model of an airplane mounted in connection with the base for movement in a predetermined path about the tower, means to maintain the airplane on a predetermined heading throughout said path, a radio compass dial on the airplane, a rotary pointer movable with the airplane and readable on the dial, means to maintain said pointer in a predetermined position relative to the tower throughout said path of the airplane; a magnetic compass dial mounted for movement as a unit with the airplane throughout said path, the airplane and said magnetic compass dial being normally relatively fixed but manually adjustable to alter the predetermined heading of the airplane, and an element on the airplane readable on the magnetic compass dial; the dials and airplane being superimposed with the airplane between said dials.

10. An airplane radio compass demonstrator comprising a base, a representation of a radio tower on the base, a model of an airplane mounted in connection with the base for movement in a predetermined path about the tower, means to maintain the airplane on a predetermined heading throughout said path, a radio compass dial on the airplane, a rotary pointer movable with the airplane and readable on the dial, means to maintain said pointer in a predetermined position relative to the tower throughout said path of the airplane; a magnetic compass dial mounted for movement as a unit with the airplane throughout said path, the airplane and said magnetic compass dial being normally relatively fixed but manually adjustable to alter the predetermined heading of the airplane, and an element on the airplane readable on the magnetic compass dial; the dials and airplane being superimposed with the airplane between said dials, the magnetic compass dial being beneath the airplane, the airplane having a window therein and said element being a cross hair intersecting the window and reading on the magnetic compass dial.

11. An airplane radio compass demonstrator comprising a base, a representation of a radio tower on the base, a member mounted on the base for rotary movement about said tower as an axis, a model of an airplane supported on said member outwardly of the tower for movement about the latter in a circular path, means to maintain the airplane on a predetermined heading throughout said path, a radio compass dial on the airplane, a rotary pointer movable with the airplane and readable on the dial, and means to maintain said pointer in a predetermined position relative to the tower throughout said path of the airplane.

12. An airplane radio compass demonstrator comprising a base, a representation of a radio tower on the base, a member mounted on the base for rotary movement about said tower as an axis, a model of an airplane supported on said member outwardly of the tower for movement about the latter in a circular path, means to maintain the airplane on a predetermined heading throughout said path, a radio compass dial on the airplane, a rotary pointer movable with the airplane and readable on the dial, and means to maintain said pointer in a predetermined position relative to the tower throughout said path of the airplane; there being a magnetic compass dial movable as a unit with the airplane throughout said path, the airplane including an element readable on said magnetic compass dial, said airplane and magnetic compass dial being normally relatively fixed but manually adjustable relative to each other whereby to alter the predetermined heading of the airplane.

13. An airplane radio compass demonstrator comprising a base, a representation of a radio tower on the base, a member mounted on the base for rotary movement about said tower as an axis, a model of an airplane supported on said member outwardly of the tower for movement about the latter in a circular path, means to maintain the airplane on a predetermined heading throughout said path, a radio compass dial on the airplane, a rotary pointer movable with the airplane and readable on the dial, and means to maintain said pointer in a predetermined position relative to the tower throughout said path of the airplane; said first named means comprising a fixed pulley concentric to the axis of said member, a rotatable pulley mounted on the member radially out from said axis and supporting the airplane, the pulleys being of the same diameter, and an endless belt extending between said pulleys.

14. An airplane radio compass demonstrator comprising a base, a representation of a radio tower on the base, a member mounted on the base for rotary movement about said tower as an axis, a model of an airplane supported on said member outwardly of the tower for movement about the latter in a circular path, means to maintain the airplane on a predetermined heading throughout said path, a radio compass dial on the airplane, a rotary pointer movable with the airplane and readable on the dial, and means to maintain said pointer in a predetermined position relative to the tower throughout said path of the airplane; said last named means including a spindle fixed on and upstanding from the member, the airplane being rotatable about said spindle, and said pointer being attached in normally fixed relation to said spindle.

15. An airplane radio compass demonstrator comprising a base, a representation of a radio tower on the base, a member mounted on the base for rotary movement about said tower as an axis, a pulley non-rotatably fixed in connection with the base concentric with the axis of said member, another pulley rotatably mounted on the member by means of an upstanding spindle on said member radially out from the axis of the latter, the axis of said pulleys being parallel, an endless belt connecting said pulleys, a model of an airplane secured in connection with said other pulley for rotation therewith, a radio compass dial secured on the airplane concentric to the spindle, and a pointer secured on said spindle and reading on the dial.

16. An airplane radio compass demonstrator comprising a base, a representation of a radio tower on the base, a member mounted on the base for rotary movement about said tower as an axis, a pulley non-rotatably fixed in connection with the base concentric with the axis of said member, another pulley rotatably mounted on the member by means of an upstanding spindle on said member radially out from the axis of the latter, the axis of said pulleys being parallel, an endless belt connecting said pulleys, a model of an airplane secured in connection with said other pulley for rotation therewith, a radio compass dial secured on the airplane concentric to the spindle, and a pointer secured on said spindle and reading on the dial; there being a magnetic compass dial secured concentrically in connection with said other pulley and airplane as a unit and rotatable therewith, and an element on the airplane readable on the magnetic compass dial, the airplane and said magnetic compass dial being normally relative fixed but arranged for manual relative rotative adjustment.

17. A device as in claim 16 in which the airplane and said dials are superimposed, the airplane being between the dials, and the magnetic compass dial being beneath the airplane.

MELVIN R. ANDREWS.